(12) United States Patent
Irwin

(10) Patent No.: US 7,229,376 B1
(45) Date of Patent: Jun. 12, 2007

(54) ADJUSTABLE DRAIN-BACK BAFFLE

(75) Inventor: Earl James Irwin, Ft. Wayne, IN (US)

(73) Assignee: Torque-Traction Technologies, LLC., Maumee, OH (US)

( * ) Notice: Subject to any disclaimer, the term of this patent is extended or adjusted under 35 U.S.C. 154(b) by 199 days.

(21) Appl. No.: 10/995,204

(22) Filed: Nov. 24, 2004

(51) Int. Cl.
*F16H 57/04* (2006.01)

(52) U.S. Cl. .................................... 475/160

(58) Field of Classification Search ............... 475/160; 184/6.12
See application file for complete search history.

(56) References Cited

U.S. PATENT DOCUMENTS

| 2,015,108 | A |   | 9/1935 | Harper |
|---|---|---|---|---|
| 2,037,173 | A | * | 4/1936 | Matthews .................. 184/11.1 |
| 3,413,873 | A | * | 12/1968 | Bixby ....................... 475/160 |
| 4,157,045 | A |   | 6/1979 | Suzuki |
| 4,776,237 | A |   | 10/1988 | Premiski et al. |
| 5,085,100 | A |   | 2/1992 | Duello |
| 6,126,565 | A | * | 10/2000 | Irwin ........................ 475/160 |
| 6,345,712 | B1 | * | 2/2002 | Dewald et al. ............. 192/221 |

\* cited by examiner

*Primary Examiner*—Richard M. Lorence
*Assistant Examiner*—Edwin A. Young
(74) *Attorney, Agent, or Firm*—Berenato, White & Stavish

(57) ABSTRACT

A lubrication system of an axle assembly comprising a differential carrier rotatably supporting a differential case therewithin, an axle tube extending outwardly from the differential carrier, a bearing assembly for rotatably supporting the differential case within the differential carrier, and an annular drain-back baffle formed with a drain-back hole passing through the drain-back baffle and defining an oil delivery passage between the differential carrier and the axle tube. The drain-back baffle is selectively positioned within the axle assembly to provide changeable oil flow characteristics of the axle assembly. A method is provided for controlling flow of lubricant between a differential gear and an axle tube by selectively adjusting the position of the drain-back channel in order to provide the desired lubricant flow path.

18 Claims, 3 Drawing Sheets

ADJUSTABLE DRAIN-BACK BAFFLE

BACKGROUND OF THE INVENTION

1. Field of the Invention

The present invention relates to a lubrication system of an axle assembly used in a power transmission system, such as one for a motor vehicle.

2. Description of the Prior Art

A conventional axle assembly of a motor vehicle comprises a differential gear and a pair of drive shaft assemblies penetrating both sides thereof. A solid annular spacer is provided between a side bearing assembly and a differential carrier. The drive shafts are ordinarily disposed within the axle shaft tubes.

Normally in operation, lubricant from the differential carrier penetrates the axle shaft tubes due to the splashing of the lubricant by rotation of a differential ring gear, or by other means.

When axle assemblies are of full floating type, the wheel ends do not require lubrication. Therefore, the lubricant entrapped inside the axle tubes should be returned to the differential carrier. For this purpose, the differential carrier of conventional design is formed with a cast-in drain-back channel facing downward.

Alternatively, when axle assemblies are of semi-floating type, the wheel ends require adequate lubrication. In this case, it is desirable to keep certain amount of lubricant inside the axle shaft tubes. For this purpose, the differential carrier is formed with the cast-in drain-back channel facing upward that allows lubricant to be trapped in the axle tube bores.

Many differential carriers are structurally substantially identical except for the radial position of the drain-back channel. The type of the axle assembly the differential carrier is used in determines the radial position of the drain-back channel. This requires at least two different variations of the differential carriers: for full-floating type axle assemblies and for semi-floating type axle assemblies each provided with the cast-in drain-back channels, however positioned differently.

Moreover, with the current method of production, the differential carrier may have all the requirements needed for a particular axle assembly except the cast-in drain-back channel is in the wrong position. Thus, a new carrier has to be made.

Accordingly, it is the intent of this invention to overcome these shortcomings of the prior art, and more specifically, to eliminate the cast-in drain-back channels in the differential carriers.

SUMMARY OF THE INVENTION

A lubrication system for an axle assembly of a motor vehicle in accordance with the preferred embodiment of the present invention comprises a differential case rotatably mounted within a differential carrier, an axle tube extending outwardly from the differential carrier, a bearing assembly for rotatably supporting the differential case within said differential carrier, and an annular drain-back baffle formed with a single drain-back hole passing through the drain-back baffle and defining an oil delivery passage between the differential carrier and the axle tube.

The present invention alleviates the drawbacks of the prior art by providing the drain-back baffle selectively positionable within the axle assembly for controlling the flow of a lubricant oil into and out of axle tube assemblies and providing a desired lubricant oil flow path that would allow the axle assembly manufacturers to use the same differential carrier for both full-floating and semi-floating types of axle assemblies and eliminate cast-in drain-back channel in the differential carriers. With the drain-back baffle of the present invention any oil flow or oil level in the axle tube can be achieved by controlling the angle of the drain-back hole in the drain-back baffle relative to the differential carrier during assembly.

Furthermore the present invention provides a method for controlling flow of lubrication in the axle assembly between the differential gear and the axle tube by selectively positioning the drain-back baffle in a predetermined angular position.

Thus, the advantage of the present invention is that it provides the axle assembly including the differential carrier and the separate drain-back baffle (instead of cast-in drain-back channel of the prior art) selectively positionable relative to the differential carrier.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings. For purposes of the following description, certain terminology is used in the following description for convenience only and is not limiting. The words "inwardly" and "outwardly" refer to directions toward and away from, respectively, the geometric center of an apparatus of the present invention and designated parts thereof. The words "uppermost" and "lowermost" refer to position relative to vertical axis of the apparatus of the present invention. The terminology includes the words specifically mentioned above, derivatives thereof and words of similar import. Additionally, the word "a," as used in the claims, means "at least one."

Figure 1:
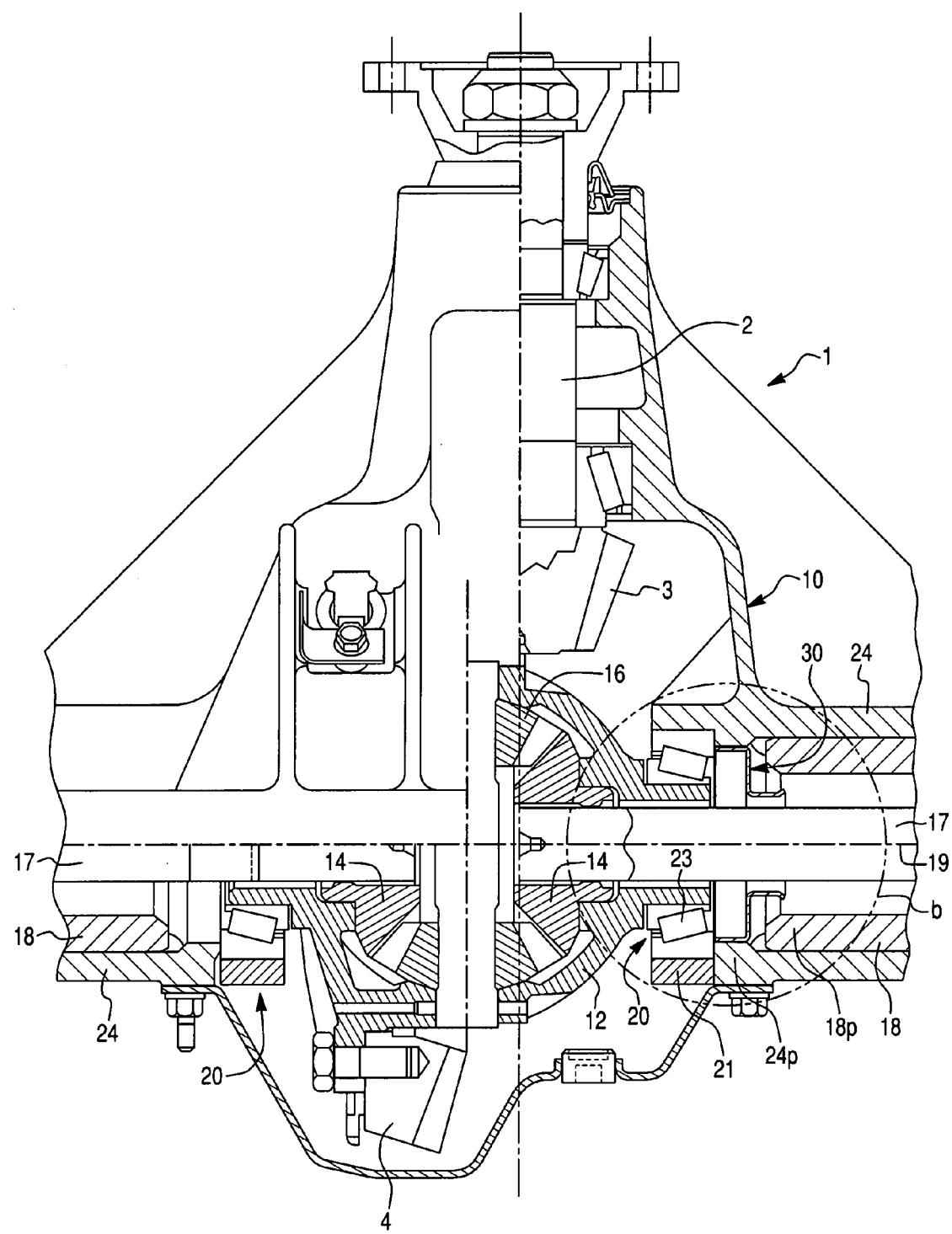
FIG. 1 is a transverse sectional view of the axle assembly of the present invention.
Figure 2:
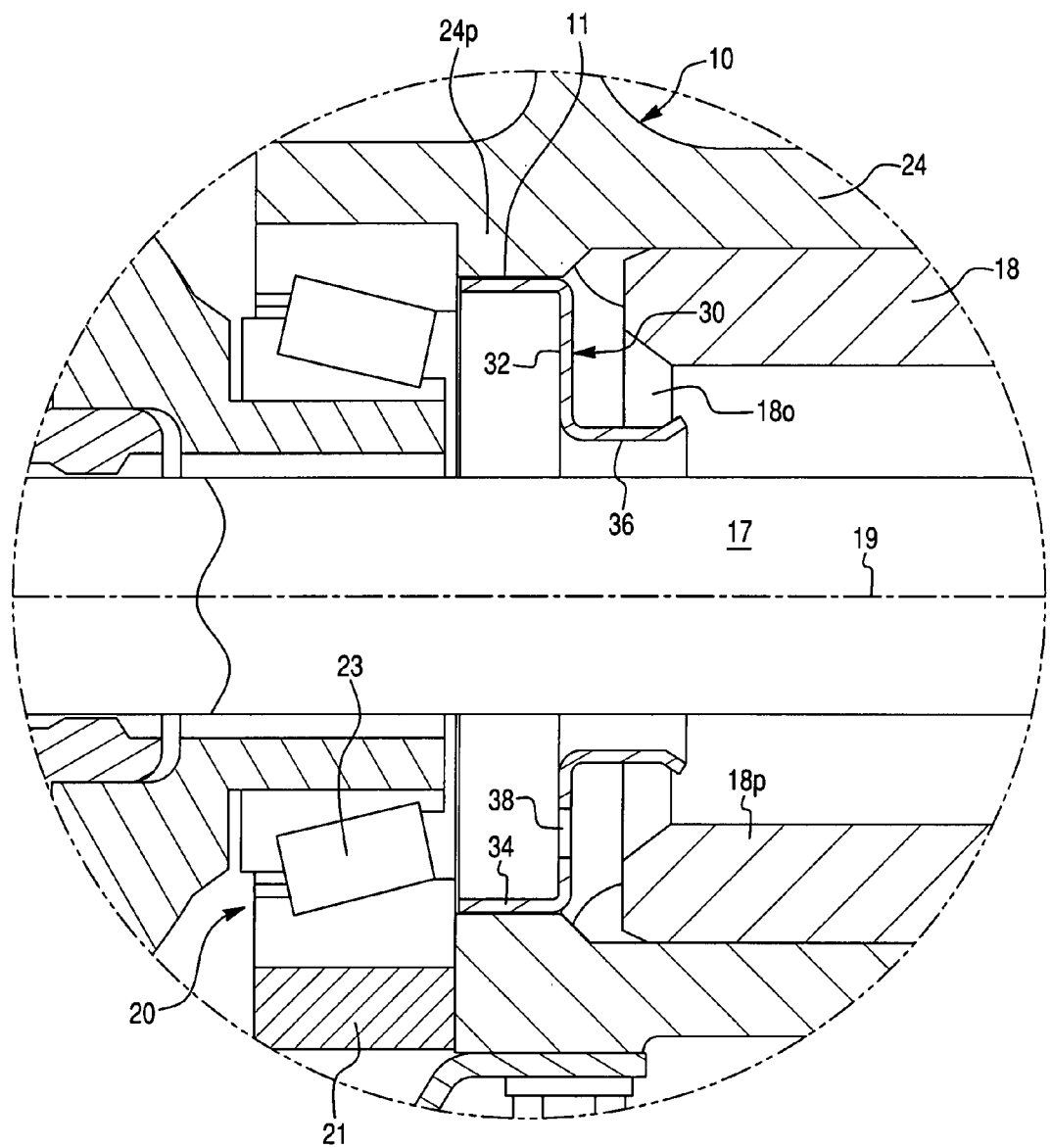
FIG. 2 is a partial enlarged sectional view of the axle assembly showing a drain-back baffle of the present invention shown in a circle 'B' in FIG. 1.

Referring first to FIGS. 1 and 2 of the drawings, an axle assembly 1 of the present invention comprises a differential carrier 10, a differential case 12 housing a differential mechanism and rotatably supported within the differential carrier 10 via side bearing assemblies 20, and two axle tubes 18 extending outwardly from opposite sides of the differential carrier 10. Each of the side bearing assemblies 20 includes an antifriction bearing 23 and a bearing cap 21 provided for securing the bearing 23 to the differential carrier 10. A ring gear 4 is mounted to the differential case 12 to engage with a drive pinion 3 of a drive pinion shaft 2 that rotates by torque transmitted from a propeller shaft (not shown). The differential mechanism in the differential case 12 includes a pair of pinion gears 16 and right and left side gears 14 engaging the pinion gears 16. The pinion gears 16 are mounted to the differential case 12 by a pinion shaft 15, and the side gears 14 are respectively connected to axle shafts 17 by spline engagement. The axle shafts 17 are housed inside two axle tubes 18 for rotation about a central axis 19. The differential carrier 10 further includes laterally outwardly extending tubular extensions 24, which receive therein proximal ends 18*p* of the axle tubes 18. The axle assembly 1 further includes a pair of annular drain-back baffles 30 each disposed within the differential carrier 10 between one of the antifriction bearings 23 and the corresponding axle tube 18. Alternatively, the drain-back baffles 30 may be disposed within the proximal ends of the axle tubes 18.

Figure 4:
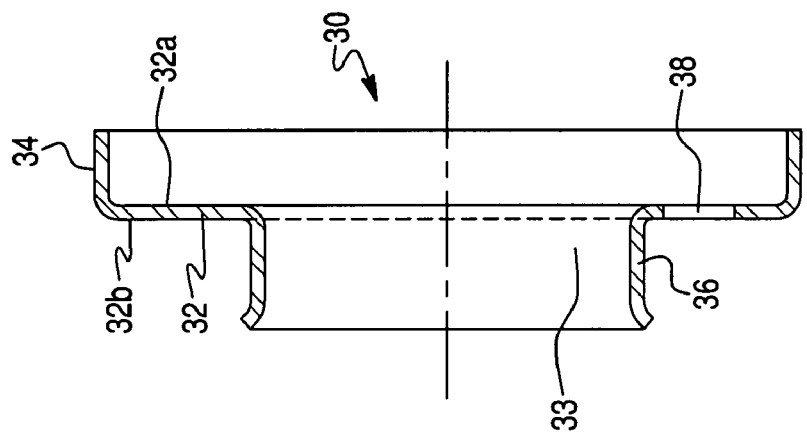
FIG. 4 is a cross-sectional view of the drain-back spacer taken in the direction of arrows A—A in the FIG. 3.
Figure 3:
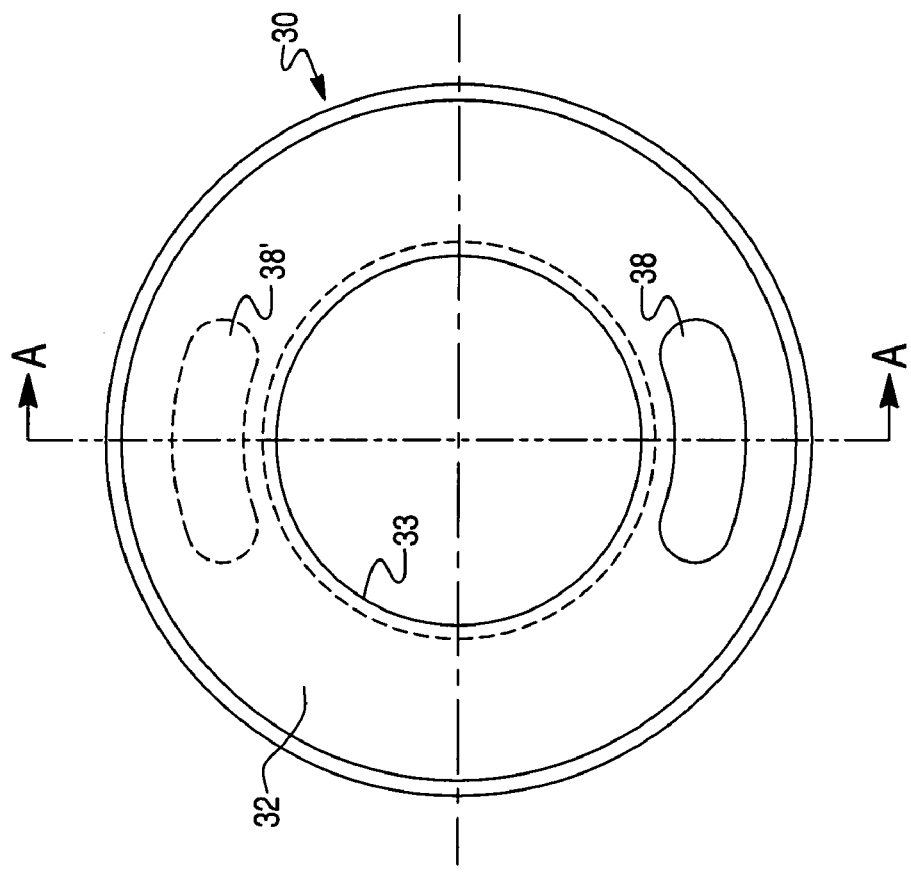
FIG. 3 is a front view of the drain-back baffle according to the preferred embodiment of the present invention.

Referring now to the FIGS. 3 and 4, each of the drain-back baffles 30 includes an integral body defined by a substantially circular baffle plate 32 having a central opening 33 therethrough, a substantially annular mounting flange 34 axially extending from an outer perimeter of the baffle plate 32, and a substantially annular center flange 36 axially extending from an inner perimeter of the baffle plate 32. The baffle plate 32 extends across an opening 180 in the proximal end 18*p* of the axle tubes 18. Preferably, the baffle plate 32 is mounted substantially orthogonally to the axle shaft 17. Moreover, the baffle plate 32 of the drain-back baffle 30 has an outboard side 32*a* facing the axle tube 18 and an inboard side 32*b* facing the bearing assembly 20. Furthermore, the baffle plate 32 of the drain-back baffle 30 is provided with a lubricant drain-back hole 38 formed therethrough and extending between the outboard side 32*a* and inboard side 32*b* thereof. As illustrated, the drain-back hole 38 is radially spaced from the central opening 33. The drain-back hole 38 could be in the any other appropriate shape and size depending on the particular axle application. Preferably, the drain-back baffle 30 is homogeneously formed as a single-piece unitary body from any appropriate material, such as plastic or metal, by any appropriate method, such as molding, stamping, etc.

The axle shaft 17 extends through the central opening 33 of the drain-back baffle 30. The radial position of the drain-back hole 38 in the drain-back baffle 30 is determined by the type of the axle assembly the differential carrier is used in.

As it was mentioned above, in operation certain amount of the differential lubricant penetrates the space defined by the axle tube 18 usually due to the splashing of the lubricant by rotation of the ring gear 4, or by other means.

If the full floating type axle assembly that does not require lubrication of its axle ends (not shown) is employed, the lubricant should be drained back to a differential carrier bowl (not shown).

If, alternatively, the semi-floating type axle that does require lubrication of its axle ends is employed, it is necessary to trap certain amount of the lubricant in the axle tubes 18.

The present invention contemplates a method for controlling flow of the lubricant in the axle assembly, more specifically, the flow of the lubricant draining back from the axle tube to the differential carrier bowl which will be described below.

During the assembling of the axle assembly 1, the drain-back baffle 30 having the drain-back hole 38, is mounted within the differential carrier 10 between one of the antifriction bearings 23 and the corresponding axle tube 18. Preferably, the drain-back baffle 30 is press-fit within a substantially annular aperture 11 within the differential carrier 10 formed between one of the antifriction bearings 23 and the corresponding axle tube 18 so that the mounting flange 34 of the drain-back baffle 30 frictionally engages a substantially annular inner peripheral surface of the aperture 11, thus providing a press-fit connection between the differential carrier 10 and the drain-back baffle 30. Further preferably, the aperture 11 is formed at a proximal end 24*p* of the tubular extension 24 of the differential carrier 10. Alternatively, the drain-back baffle 30 may be mounted in the proximal end 18*p* of the axle tubes 18. The final step is selectively positioning the drain-back baffle 30 relative to the differential carrier 10 and/or the axle tube 18 for properly orienting the drain-back hole 38 in order to provide a desired lubricant flow path.

In the preferred embodiment, the step of positioning the drain-back baffle 30 is achieved by rotating the baffle 30 to a predetermined angular position so as to orient the drain-back hole 38 in a desired position relative to the axle tube 18. Once the oil flow requirements are determined, the drain-back baffle 30 is press-fit into the annular aperture 11 within the differential carrier 10 at the required angle by an appropriate tooling.

More specifically, in case of full float type axle assembly, when the axle ends do not require lubrication, the drain-back baffle 30 is positioned such a way that the drain-back hole 38 is disposed in a lowermost position (as illustrated in solid line in FIG. 3), thus allowing the lubricant to return to the differential carrier bowl.

Alternatively, in case of semi-float type axle assembly, when the axle ends do require lubrication, the drain-back baffle 30 is positioned such a way that the drain-back hole 38 is disposed in an uppermost position (as marked by numeral 38' shown in dash lines on FIG. 3), thus trapping the certain amount of the lubricant in the axle tubes 18 for lubrication. It will be appreciated that the drain-back baffle 30 may be selectively positioned in any other position between the lowermost and uppermost positions if needed depending of the lubricating requirements of the particular axle assembly.

Therefore, the present invention embodies a novel arrangement of the lubrication system for an axle assembly comprising an annular drain-back baffle formed with a single drain-back hole passing through the drain-back baffle and defining an oil delivery passage between the differential carrier and the axle tube, wherein the drain-back baffle is oriented in one of a plurality of angular positions relative to the axle tube in order to provide a desired lubricant oil flow path between the differential carrier and the axle tube. The type of the axle assembly the differential carrier is used in determines the radial position of the drain-back hole in the drain-back baffle. The present invention alleviates the drawbacks of the prior art by providing the drain-back baffle selectively positionable within the axle assembly for controlling the flow of a lubricant oil into and out of axle tube assemblies and providing a desired lubricant oil flow path that would allow the axle assembly manufacturers to use the same differential carrier for both full-floating and semi-floating types of axle assemblies. In other words, with the drain-back baffle of the present invention, common carrier casting cores could be used in many cases that would substantially lower the manufacturing cost of the differential carriers. With the drain-back baffle of the present invention any oil flow or oil level in the axle tube can be achieved by controlling the angle of the drain-back hole in the drain-back baffle relative to the differential carrier during assembly.

The foregoing description of the preferred embodiments of the present invention has been presented for the purpose of illustration in accordance with the provisions of the patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A lubrication system for an axle assembly comprising:
    a differential carrier rotatably supporting a differential case therewithin;
    an axle tube extending outwardly from said differential carrier;
    a bearing assembly for rotatably supporting said differential case within said differential carrier; and
    a drain-back baffle including a baffle plate extending across an opening in a proximal end of said axle tube and having an outboard side facing said axle tube and an inboard side facing said bearing assembly, said baffle plate formed with a central opening therethrough and a drain-back hole passing axially through said baffle plate so as to extend between said outboard side and inboard side thereof;
    said drain-back hole radially spaced from said central opening and defining an oil delivery passage between said differential carrier and said axle tube;
    said drain-back baffle being selectively positionable within said axle assembly to provide changeable oil flow characteristics.

2. The lubrication system as defined in claim 1, wherein said drain-back baffle is oriented in one of a plurality of angular positions relative to said axle tube in order to provide a desired lubricant oil flow path between said differential carrier and said axle tube.

3. The lubrication system as defined in claim 1, wherein said drain-back baffle is selectively secured within said axle assembly.

4. The lubrication system as defined in claim 3, wherein said drain-back baffle is selectively secured within said axle assembly by press-fitting.

5. The lubrication system as defined in claim 1, wherein said drain-back baffle is selectively secured within said differential carrier.

6. The lubrication system as defined in claim 5, wherein said drain-back baffle is selectively secured within said differential carrier by press-fitting.

7. The lubrication system as defined in claim 1, wherein said baffle plate extends substantially orthogonally to said axle tube.

8. The lubrication system as defined in claim 7, wherein said drain-back baffle further includes a mounting flange axially extending from an outer perimeter of said baffle plate, said mounting flange frictionally engages an inner peripheral surface of said axle assembly.

9. A lubrication system for an axle assembly comprising:
    a differential carrier rotatably supporting a differential case therewithin;
    an axle tube extending outwardly from said differential carrier;
    a bearing assembly for rotatable supporting said differential case within said differential carrier; and
    a drain-back baffle formed with a drain-back hole passing through said drain-back baffle and defining an oil delivery passage between said differential carrier and said axle tube;
    said drain-back baffle being selectively positionable within said axle assembly to provide changeable oil flow characteristics,
    wherein said drain-back baffle is selectively secured within said axle tube.

10. The lubrication system as defined in claim 9, wherein said drain-back baffle is selectively secured within said axle tube by press-fitting.

11. A method for controlling flow of a lubricant in an axle assembly, said method comprising the steps of:
    providing a drain-back baffle formed with a drain-back hole passing through said drain-back baffle for controlling the flow of a lubricant oil into and out of an axle tube of said axle assembly;
    said drain-back baffle including a baffle plate extending across an opening in a proximal end of said axle tube and having an outboard side facing said axle tube and an inboard side facing a bearing assembly, said baffle plate formed with a central opening therethrough and said drain-back hole passing axially through said baffle plate so as to extend between said outboard side and inboard side thereof, said drain-back hole radially spaced from said central opening;
    selectively positioning said drain-back baffle in one of a plurality of angular positions relative to said axle tube in order to provide a desired lubricant oil flow path between a differential carrier and said axle tube; and
    securing said drain-back baffle in place relative to said differential carrier within said axle assembly.

12. The method as defined in claim 11, wherein said drain-back baffle is selectively secured within said axle assembly by press-fitting.

13. The method as defined in claim 11, wherein said drain-back baffle is selectively secured within said differential carrier.

14. The method as defined in claim 13, wherein said drain-back baffle is selectively secured within said differential carrier by press-fitting.

15. The method as defined in claim 11, wherein said drain-back baffle is selectively secured within said axle tube.

16. The method as defined in claim 15, wherein said drain-back baffle is selectively secured within said axle tube by press-fitting.

17. The method as defined in claim 11, wherein said baffle plate extends substantially orthogonally to said axle tube.

18. The method as defined in claim 17, wherein said drain-back baffle further includes a mounting flange axially extending from an outer perimeter of said baffle plate, said mounting flange frictionally engages an inner peripheral surface of said axle assembly.

* * * * *